(12) United States Patent
Gigliotti et al.

(10) Patent No.: US 9,223,557 B1
(45) Date of Patent: Dec. 29, 2015

(54) APPLICATION PROVIDED BROWSER PLUGIN

(71) Applicant: Amazon Technologies, Inc., Reno, NV (US)

(72) Inventors: Samuel Scott Gigliotti, Seattle, WA (US); Eugene Gershnik, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 22 days.

(21) Appl. No.: 13/889,715

(22) Filed: May 8, 2013

(51) Int. Cl.
*G06F 9/445* (2006.01)
*G06F 17/30* (2006.01)

(52) U.S. Cl.
CPC .............. *G06F 8/61* (2013.01); *G06F 9/44526* (2013.01); *G06F 9/445* (2013.01); *G06F 17/30861* (2013.01); *G06F 2221/2119* (2013.01)

(58) Field of Classification Search
None
See application file for complete search history.

(56) References Cited

U.S. PATENT DOCUMENTS

| | | | |
|---|---|---|---|
| 7,509,638 B2 * | 3/2009 | Backhouse et al. | 717/177 |
| 7,941,560 B1 * | 5/2011 | Friesen et al. | 709/245 |
| 8,316,387 B2 * | 11/2012 | Turski | 719/330 |
| 8,402,011 B1 * | 3/2013 | Bodenhamer | 707/706 |
| 8,935,755 B1 * | 1/2015 | Kay | 726/4 |
| 2004/0030784 A1 * | 2/2004 | Abdulhayoglu | 709/227 |
| 2004/0083474 A1 * | 4/2004 | McKinlay et al. | 717/176 |
| 2006/0026591 A1 * | 2/2006 | Backhouse et al. | 717/177 |
| 2007/0107019 A1 * | 5/2007 | Romano et al. | 725/80 |
| 2007/0174424 A1 * | 7/2007 | Chen et al. | 709/217 |
| 2007/0180490 A1 * | 8/2007 | Renzi et al. | 726/1 |
| 2008/0120563 A1 * | 5/2008 | Tang et al. | 715/771 |
| 2010/0058353 A1 * | 3/2010 | Turski | 719/311 |
| 2011/0016382 A1 * | 1/2011 | Cahill et al. | 715/234 |
| 2011/0022984 A1 * | 1/2011 | van der Meulen et al. | 715/830 |
| 2011/0138473 A1 * | 6/2011 | Yee et al. | 726/26 |
| 2011/0185013 A1 * | 7/2011 | Obata et al. | 709/203 |
| 2014/0059708 A1 * | 2/2014 | Chou et al. | 726/30 |

OTHER PUBLICATIONS

D'Souza, M.G., Plug-In Fundamentals, Expert Oracle Application Express Plug-Ins, Chapter 2, 2011, pp. 7-28, [retrieved on Aug. 3, 2015], Retrieved from the Internet: <URL:http://link.springer.com/chapter/10.1007/978-1-4302-3504-0_2>.*

Jablonski, S., et al., Basic Programming Concepts for Web Applications, Guide to Web Application and Platform Architectures, Chapter 5, 2004, pp. 77-98, Retrieved from the Internet: <URL:http://link.springer.com/chapter/10.1007/978-3-662-07631-6_5>.*

* cited by examiner

*Primary Examiner* — Thuy Dao
*Assistant Examiner* — Geoffrey St Leger
(74) *Attorney, Agent, or Firm* — Sutherland Asbill & Brennan LLP

(57) ABSTRACT

An application may be installed on a user device. Installing the application may include receiving and storing an executable application, a plugin, and an application manifest. The application manifest may include a path corresponding to the plugin and one or more rules associated with the plugin. A webpage may be requested from the web server. The webpage may be parsed to determine that the webpage includes an instruction to use the plugin. It may be determined that the application includes the plugin. The path corresponding to the plugin may be obtained from the application manifest. The webpage may be presented using the plugin.

21 Claims, 5 Drawing Sheets

APPLICATION PROVIDED BROWSER PLUGIN

BACKGROUND

Plugins are software components that may extend or enhance functionality supported by a larger software application. For example, a plugin associated with a web browser may support functionality that the web browser may not otherwise be capable of supporting, such as presenting certain types of content to a user.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Figure 1:
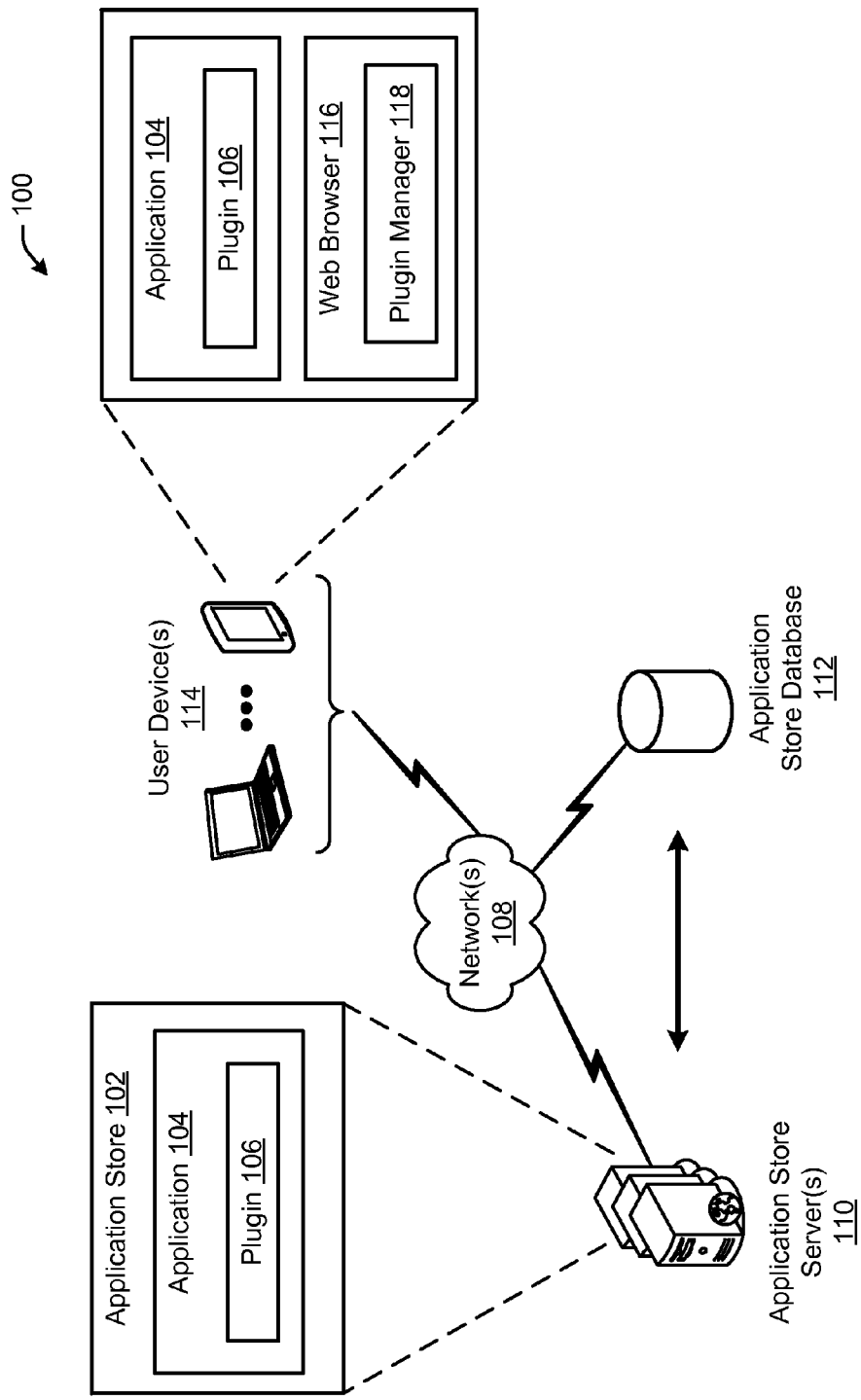
FIG. 1 is a block diagram of an illustrative system for an application provided browser plugin in accordance with an embodiment of the disclosure.

Systems, methods, and computer-readable media in accordance with various embodiments of the present disclosure may provide users with the capability to install application provided browser plugins. Plugins are software components that may extend or enhance functionality supported by a larger software application. A plugin may be independently developed by third party developers. Further, plugins may be loaded at runtime. Applications that accept plugins may need to be specifically designed to provide an interface to allow for the plugin. Additionally, applications may not know of the existence of the plugins at the time of the distribution of the application. Any plugin in accordance with the application programming interface (API) of the application may be accepted by the application even if the application is unaware of the plugin. In some embodiments, a plugin may declare that it handles certain content types through exposed file information. If the browser encounters such content type, the browser may load the associated plugin. In some embodiments, the browser may set aside space within the browser content for the plugin to render itself and stream data to it. The plugin may then be responsible for rendering the data.

A wide variety of types of plugins may be provided that support various types of functionality. For example, a plugin for a web browser may provide the web browser with capabilities that the web browser may not otherwise be able to support such as the ability to present content to a user using a high-definition media interface (HDMI). As another non-limiting example, a plugin for a web browser may expose one or more application programming interfaces (APIs) of an application to the web browser to enable the browser to support functionality similar to that supported by the application. A web browser plugin may also augment or facilitate digital rights management between the web browser and an application. For example, if an application requires a user to log in and verify his or her identity, the plugin may allow the web browser to access the authentication credentials used by the application to avoid the user having to sign in again separately from the application.

Some computing devices may not permit users to install application provided browser plugins due to security restrictions, performance issues, or stability issues. The systems, methods, computer-readable media, and techniques described herein may be utilized to provide plugins downloaded in association with applications to an execution environment, such as an execution environment associated with a mobile device (e.g., a smartphone, tablet, etc.). By bundling plugins with applications, security parameters associated with the applications may also be applied to the plugins.

Various methods may be used to determine the applicability of the plugin to the webpage, including permissions specified by the plugin developer, the webpage domain, regular expressions matching of the webpage URL, whether the user is logged into the webpage, or the like. In some embodiments, an application may be downloaded or received by a user device. The application may include one or more plugins. In response to the download or receipt of the application by the user device, an entry may be created and stored by the plugin manager of the web browser based at least in part on an application manifest associated with the application. An application manifest may be a document that defines the structure and content of an application. Prior to loading a webpage, a browser executing on the user device may determine whether any plugins associated with the webpage are available. In some embodiments, a webpage may be written in HTML. A plugin may be denoted in the HTML through one or more tags, such as an embed tag or an object tag. In some embodiments, the browser may check one or more application manifests to determine if any plugins are available.

In another example, the browser may determine whether a permission level associated with the plugin is designated as public or private. If the permission level is indicated as public, the web browser may obtain the plugin and load the webpage using the plugin. If the permission level is indicated as private, the web browser may determine whether the webpage is associated with an application where the plugin resides. If the webpage is associated with the application, the web browser may obtain the plugin. If the webpage is not associated with the application, the web browser may be denied access to the plugin, and the webpage may be loaded without the plugin. In some embodiments, access to the plugin may be managed by a plugin manager. Access to the plugin may also be controlled with an access control list. For example, access to the plugin may be controlled by an access control list based on the webpage address.

In some embodiments, the web browser may be modified so that the browser checks one or more locations outside of its own directory space to attempt to locate plugins. In some embodiments, the need to separately identify and install plugins may be reduced or eliminated because the plugins are downloaded or received in connection with the download or receipt of the application.

Illustrative System

FIG. 1 depicts a block diagram of an illustrative system architecture 100 for providing application provided browser plugins. In brief overview, an application 104 may be available from an application store 102 hosted or otherwise provided by one or more application store servers 110. The application 104 may include one or more plugins 106. The application 104 may be stored and retrieved from one or more application store databases 112 by the application store server(s) 110. In some embodiments, the application store database(s) 112 may be communicatively linked to the application store server(s) 110 and the application store server(s) 110 may communicate with the application store database(s) 112 over one or more networks 108. For ease of explanation, any of the components depicted in FIG. 1 may be described in the singular hereinafter; however, it should be appreciated that a plural number of any such components may be provided.

In some embodiments, application providers (e.g., developers) may submit applications 104 to be made available for download from the application store server 110 and installation on one or more user devices 114. The application store server 110 may permit application providers to upload applications (e.g., application 104) and any associated documentation or information. The application 104 may include one or more plugins that may be stored in a directory space of the application 104 on a user device 114 to which the application 104 is downloaded.

In some embodiments, the application store 102 may receive applications (e.g., application 104) from application developers or companies over one or more networks 108. The network(s) 108 may include, but are not limited to, any one or more different types of suitable communications networks, such as cable networks, the Internet, wireless networks, cellular networks, or other private and/or public networks. Further, the network(s) 108 may include any type of medium over which network traffic may be carried including, but not limited to, coaxial cable, twisted-pair wire, optical fiber, hybrid fiber coaxial (HFC), microwave terrestrial transceivers, a radio frequency communication medium, a satellite communication medium, or any combination thereof.

In an embodiment, a user may select an application (e.g., the application 104) for download from the application store 102 using a user device 114. The user device 114 may download and install the application 104. In some embodiments, the application 104 may include one or more plugins 106. In some embodiments, the user device 114 may obtain the application 104 with plugins 106 through an alternate mechanism, such as a website, an ftp site, or the like.

One or more web browsers 116 may be provided on the user device 114 for accessing one or more webpages. One or more plugin managers 118 may be provided in association with the web browser 116. Prior to loading a webpage, the plugin manager 118 may determine whether a plugin 106 is available for the webpage. If available, the plugin manager 118 may determine whether the browser 116 may access the identified plugin 106. The plugin manager 118 may obtain the plugin 106 from the application 104 and enable the web browser 116 to use the plugin 106 to present the webpage with augmented functionality provided by the plugin 106.

Those of ordinary skill in the art will appreciate that any of the components of the architecture 100 may include alternate and/or additional hardware, software or firmware components beyond those described or depicted without departing from the scope of the disclosure. More particularly, it should be appreciated that software, firmware or hardware components depicted or described as forming part of any of the user device(s) 114, the application store server(s) 110 and/or the application store database(s) 112, and the associated functionality that such components support, are merely illustrative and that some components may not be present or additional components may be provided in various embodiments. While various program modules (e.g., software modules) have been depicted and described with respect to various illustrative components of the architecture 100, it should be appreciated that the functionality described as being supported by the program modules may be enabled by any combination of hardware, software, and/or firmware.

It should further be appreciated that each of the above-mentioned modules may, in various embodiments, represent a logical partitioning of supported functionality. This logical partitioning is depicted for ease of explanation of the functionality and may not be representative of the structure of software, firmware and/or hardware for implementing the functionality. Accordingly, it should be appreciated that the functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

Those of ordinary skill in the art will appreciate that the illustrative networked architecture 100 depicted in FIG. 1 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative architecture 100 depicted in FIG. 1, or additional functionality.

Figure 2:
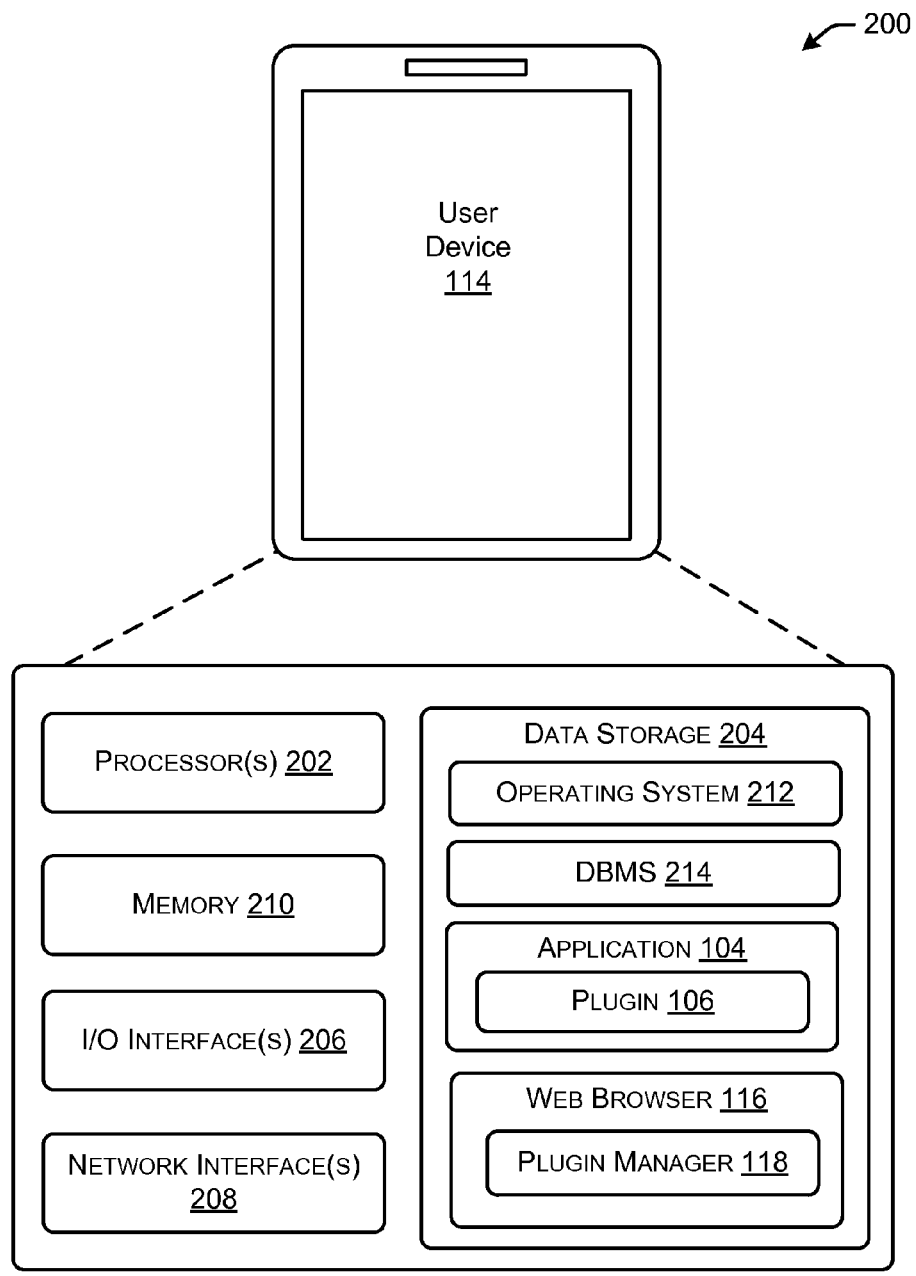
FIG. 2 is a block diagram of illustrative components of a user device that supports functionality for providing an application provided browser plugin in accordance with an embodiment of the disclosure.

FIG. 2 is a block diagram of illustrative components of the user device 114. In the illustrative configuration 200 depicted in FIG. 2, the user device 114 may include one or more processors (processor(s)) 202 and one or more memories 210 (referred to herein generically as memory 210). The processor(s) 202 may include any suitable processing unit capable of accepting digital data as input, processing the input data based on stored computer-executable instructions, and generating output data. The computer-executable instructions may be stored, for example, in the data storage 204 and may include, among other things, operating system software and application software. The computer-executable instructions may be retrieved from data storage 204 and loaded into memory 210 as needed for execution. The processor(s) 202 may be configured to execute the computer-executable instructions to cause various operations to be performed. The processor(s) 202 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 204 may store program instructions that are loadable and executable by the processor(s) 202, as well as data manipulated and generated by the processor(s) 202 during execution of the program instructions. The program instructions may be loaded into memory 210 as needed for execution. Depending on the configuration and implementation of the user device 114, the memory 210 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 210 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The user device 114 may further include additional data storage 204 such as removable storage and/or non-removable storage including, but not limited to, magnetic storage, optical disk storage, and/or tape storage. Data storage 204 may provide non-volatile storage of computer-executable instructions and other data. The memory 210 and/or the data storage 204, removable and/or non-removable storage media (CRSM).

The user device 114 may further include network interface(s) 208 that facilitate communication between the user device 114 and other devices of the illustrative system architecture 100 (e.g., the application store server(s) 110) or application software via the network(s) 108. The user device 114 may additionally include one or more input/output (I/O) interfaces 206 (and optionally associated software components such as device drivers) that may support interaction between a user and a variety of I/O devices, such as a keyboard, a mouse, a pen, a pointing device, a voice input device, a touch input device, a display, speakers, a camera, a microphone, a printer, and so forth.

Referring again to the data storage 204, various program modules, applications, or the like, may be stored therein that may comprise computer-executable instructions that when executed by the processor(s) 202 cause various operations to be performed. The memory 210 may have loaded from the data storage 204 one or more operating systems (O/S) 212 that may provide an interface between other application software (e.g., dedicated applications, a browser application, a web-based application, a distributed client-server application, etc.) executing on the user device 114 and the hardware resources of the user device 114. More specifically, the O/S 212 may include a set of computer-executable instructions for managing the hardware resources of the user device 114 and for providing common services to other application programs (e.g., managing memory allocation among various application programs). The O/S 212 may include any operating system now known or which may be developed in the future including, but not limited to, any mobile operating system, desktop or laptop operating system, mainframe operating system, or any other proprietary or open-source operating system.

The data storage 204 may further include one or more database management systems (DBMS) 214 for accessing, retrieving, storing, and/or manipulating data stored in one or more datastores. The DBMS 214 may use any of a variety of database models (e.g., relational model, object model, etc.) and may support any of a variety of query languages.

The data storage 204 may additionally include various other program modules that may include computer-executable instructions for supporting a variety of associated functionality. For example, the data storage 204 may include one or more applications 104, one or more plugins 106, one or more web browsers 116, and one or more plugin managers 118.

The application 104 may include computer-executable instructions that in response to execution by the processor(s) 202 cause operations to be performed including executing functionality supported by the application 104, facilitating the loading of plugins 106 in a web browser 116, modifying of one or more paths associated with the plugins 106, and the like.

The plugins 106 may include computer-executable instructions that in response in response to execution by the processor(s) 202 cause operations to be performed including presenting content in a particular manner to a user, scanning for viruses, displaying content associated with specified file types, and other functionality. In some embodiments, the functionality provided by the plugin 106 may augment the functionality provided by the web browser 116 to enhance a user experience associated with the web browser 116 in relation to a particular application 104.

The web browser 116 may be invoked by one or more applications executable on the user device 114 (e.g., application 104) and may be used to display or otherwise present content to a user of the user device 114. In some embodiments, the web browser 116 may initiate retrieval of one or more plugins 106. In some embodiments, the web browser 116 may retrieve code (e.g., webpage) from a remote server. The web browser 116 may invoke the identified plugin 106 based on the retrieved code.

Within the data storage 204, one or more modules may be stored. As used herein, the term module may refer to a functional collection of instructions that may be executed by the one or more processors 202. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

Illustrative Processes

In some embodiments, the user device 114 may have a database or other storage structure of applications 104 available on the device 114. The database may be populated using data extracted from application manifests associated with the applications 104. The database may permit a registration or accounting of available plugins 106 via the applications 104. A plugin manager 118 may determine the existence of plugins by parsing the application manifest files and/or the database of application data. The plugin manager 118 may determine whether a plugin exists at runtime, generally in response to a request to load a webpage.

Figure 3:
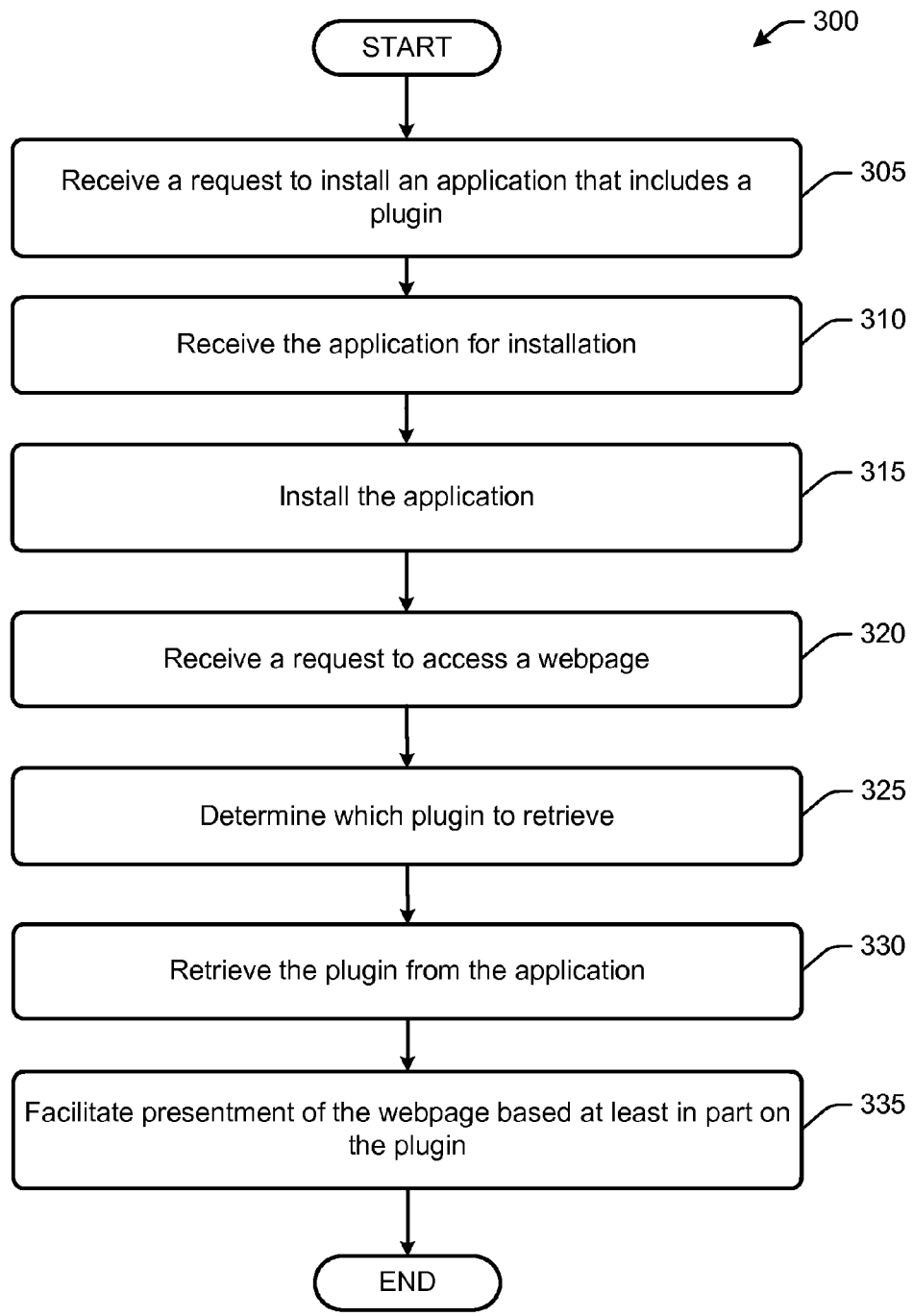
FIG. 3 is a process flow diagram of an illustrative method for an application provided browser plugin in accordance with an embodiment of the disclosure.

FIG. 3 is a process flow diagram of an illustrative method for providing application provided browser plugins in accordance with an embodiment of the disclosure. At block 305, a process associated with a user device 114 may receive a request to install an application 104 from a user. The application 104 may contain plugin 106. In some embodiments, the user of a user device 114 may use an application store 102 application to browse applications available for download. A user may select the application 104 to download from the application store 102. One or more application store servers 110 may obtain the requested application 104 and transmit the application 104 to the user device 114. In some embodiments, the user may request and receive the application 104 from a website or other forum. At block 310, the application 104 for installation may be received by the user device from one or more of the application store server(s) 110.

At block 315, the user device 114 may install the received application 104. The installed application 104 may include the plugin within its directory space. In some embodiments, the plugin manager 118 may be notified about the new plugin 114. For example, the plugin manager 118 may receive a message responsive to the detection of the new plugin 114. The plugin manager 118 may add the information regarding the new plugin 106 in a list, a registry, or a similar structure for maintaining plugin data.

At block 320, a request to access a webpage may be received. For example, a web browser 116 executing on the user device 114 may receive a request to access a webpage from a user. In some embodiments, the user may manually type in a web address or click on a hyperlink.

At block 325, a plugin manager 118 associated with the web browser 116 may determine if any plugins are applicable to the webpage. The plugin manager 118 may identify one or more plugins 106 associated with the webpage. In some embodiments, the plugin manager 118 may determine the applicability of the plugin to the webpage, including permissions specified by the plugin developer, the webpage domain, regular expressions matching of the webpage URL, whether the user is logged into the webpage, or the like. In some embodiments, the plugin manager 118 may determine whether a permission level or setting associated with the plugin 106 is set to public or private. A public setting may indicate that any website may load or otherwise utilize the plugin 106. A private setting may indicate that only a predetermined website may load or otherwise utilize the plugin 106.

At block 330, the plugin 106 may be retrieved from the previously installed application 104. In some embodiments, the web browser 116 or one or more parameters associated with the web browser 116 may be modified so that the web browser 116 determines whether any plugins are available. In some embodiments, a user may have configured settings so that any available plugin is retrieved from the respective applications automatically. The configured settings associated with the installed application may governed by the permissions associated with the installed application 104, thereby reducing any further user interaction. In some embodiments, the web browser 116 or another process executing on the user device 114 may determine, based at least in part on an application manifest associated with the application 104, the existence of the plugin 106, the location of the plugin 106, and an entry point associated with the plugin 106.

In some embodiments, an entry indicating the location of an application manifest may be added to the plugin manager 118 at the time of installation of the application 104. In some embodiments, the plugin manager 118 may dynamically determine at run time, whether any application 104 has any plugins 106 available by looking at all application manifests on the user device 114. In some embodiments, the web browser 116 may request information associated with the application 104, such as application metadata. The operating system 212 may retrieve the application manifest associated with the application 104 and provide the plugin manager 118 with the application manifest.

The plugin manager 118 may parse the application manifest to identify a path associated with the location of the plugin 106 and obtain the plugin 106 from the location designated by the path. In some embodiments, the path may indicate a set of directories within the directory space of the application 104 for the plugin manager 118 to check. In some embodiments, the plugin manager 118 may check multiple directory spaces, including directory spaces associated with the web browser 116 and the application 104.

At block 335, the process may facilitate presentment of the webpage to the user based at least in part on the plugin 106. In some embodiments, the plugin 106 may provide functionality leveraging the functionality of the application 104 in the context of the web browser 116. For example, the plugin 106 may provide the web browser 116 with the ability to present content through the webpage with the similar performance functionality of the application 104. The plugin 106 may provide the user with a hybrid user experience of a website and the application 104. In some embodiments, the plugin 106 may be compiled JAVA code, compiled C code, compiled C++, or other standard environment for the user device 114.

In some embodiments, the plugin 106 may provide additional or enhanced functionality, such as improved scrolling, smoother performance, or the like, by leveraging the functionality of the application 104. For example, the plugin 106 may permit the web browser 116 to access a cache of the application 104 to avoid duplicative download of data.

Figure 4:
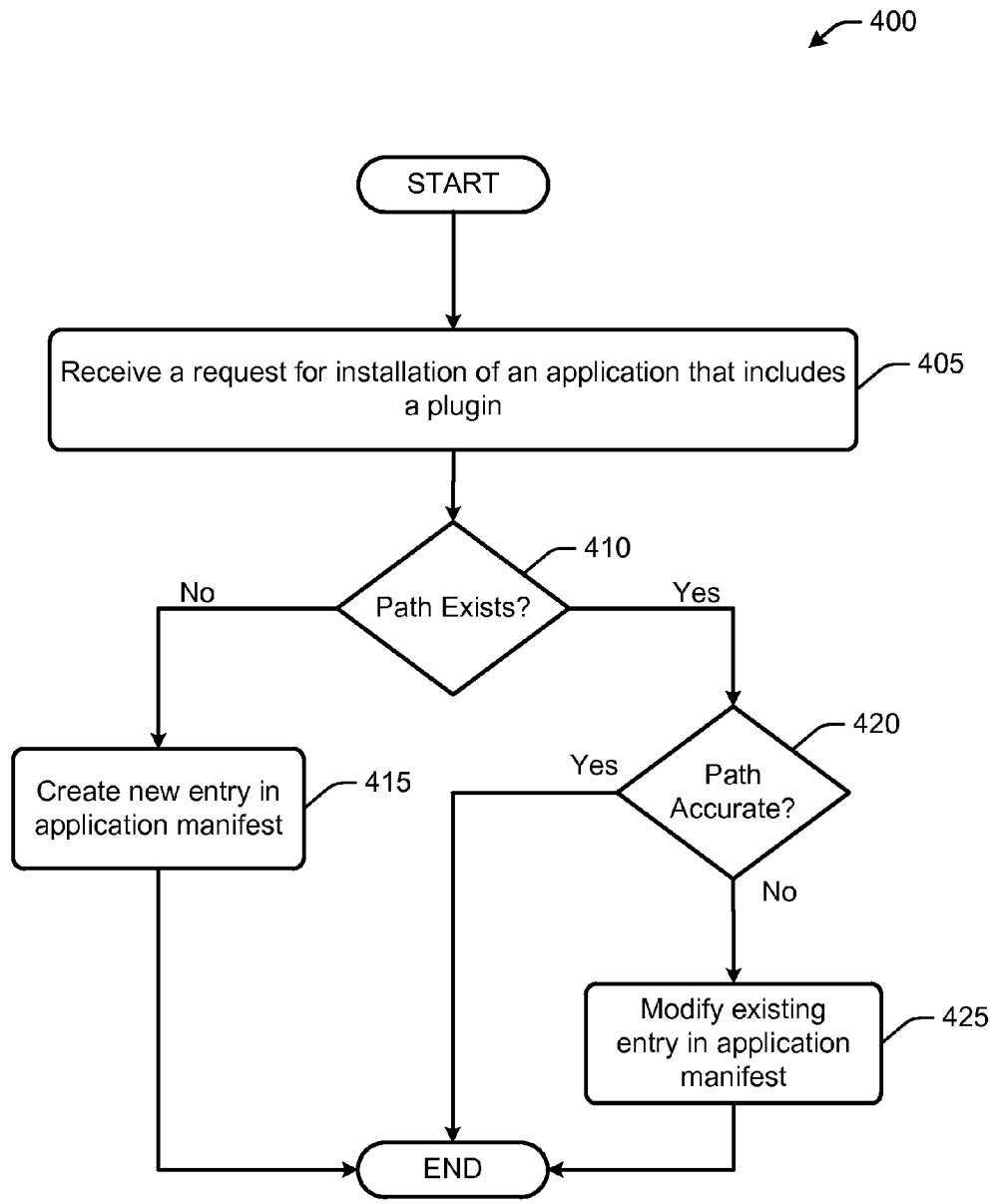
FIG. 4 is a process flow diagram of an illustrative method for modifying a path associated with an application provided browser plugin in accordance with an embodiment of the disclosure.

FIG. 4 is a process flow diagram of an illustrative method 400 for modifying a path associated with an application provided browser plugin in accordance with an embodiment of the disclosure. At block 405, a user device 114 may receive a request for installation of an application 104. The application 104 may contain comprise a plugin 106. At block 410, a determination may be made as to whether a path indicating the location of the plugin 106 exists. In some embodiments, the plugin 106 may be stored in a file or directory associated with the application 104. The path may be indicated in an entry of an application manifest which may be a document that defines the structure and content of an application 104. The application manifest may be in a markup language, such as Extensible Markup Language (XML) or JavaScript Object Notation (JSON). The application manifest may include information that provides instructions on integrating an application with a particular software platform.

If an entry does not exist in the application manifest for the plugin 106, then at block 415, a new entry may be created in the application manifest indicating the location of the plugin 106. If the entry exists, then at block 420, a determination may be made as to whether the existing path in the application manifest is accurate. If the path is accurate, the process may terminate. If the path is not accurate, then at block 425, the existing entry in the application manifest may be modified to reflect a current location of the plugin 106. The location of the plugin 106 may be specified with an absolute path according to the file system of the user device 114, or the location of the plugin 106 may specified as a relative path that is relative to the location of the application 104.

In some embodiments, proximate to the installation of an application 104 that includes a plugin 106, a plugin manager 118 may receive or obtain the application manifest associated with the application 104 and parse the application manifest to obtain the relative path of the plugin 106. The plugin manager 118 may maintain a registry or similar accounting of available plugins 106. In response to obtaining the relative path of the plugin 106, the plugin manager 118 may create an entry for the registry or similar accounting based at least in part on the relative path of the plugin 106. The plugin manager 118 may later determine whether a plugin exists at runtime by checking the registry.

Figure 5:
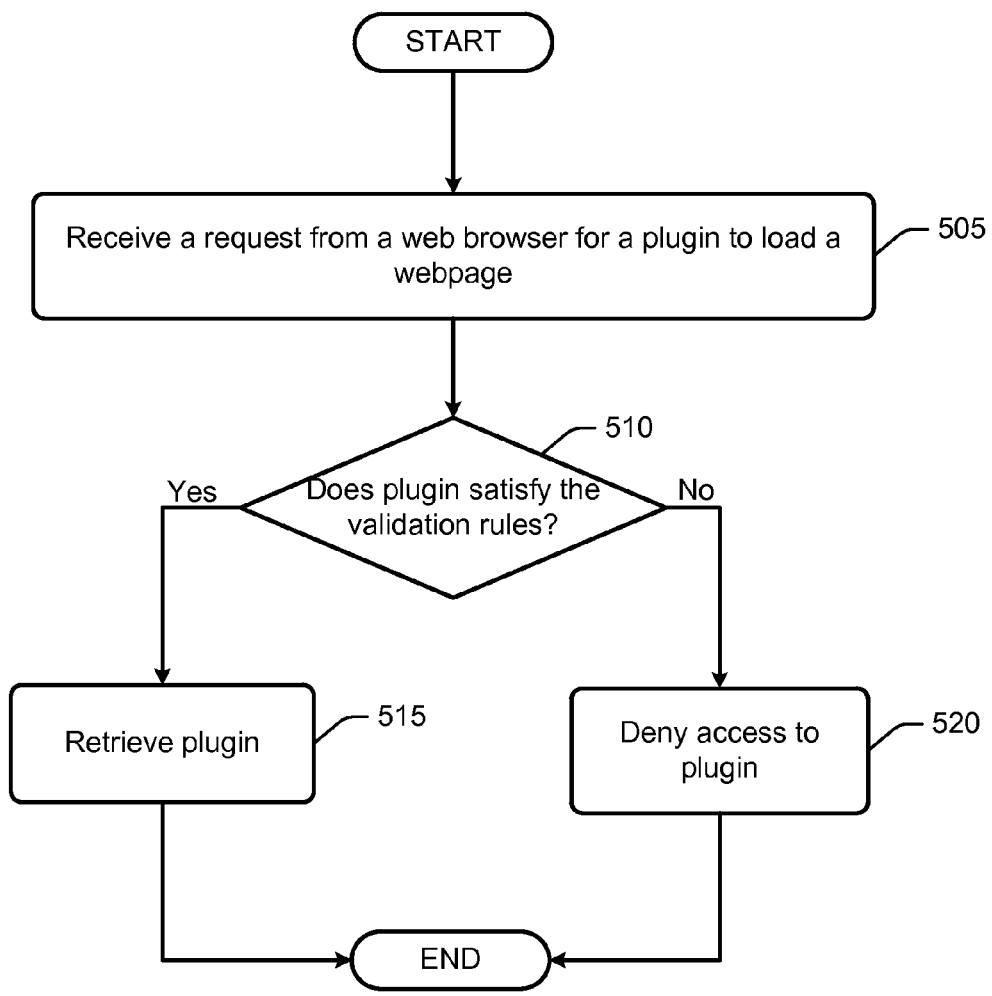
FIG. 5 is a process flow diagram of an illustrative method for determining whether to provide access to an application provided browser plugin in accordance with an embodiment of the disclosure.

FIG. 5 is a process flow diagram of an illustrative method 500 for determining whether to provide access to an application provided browser plugin 106 in accordance with an embodiment of the disclosure. At block 505, a user device 114 may receive a request for a plugin 106 from a web browser 116 attempting to load a webpage.

At block 510, a determination may be made as to whether the plugin satisfies one or more validation rules. In some embodiments, the validation rules may determine the applicability of the plugin 106 to the webpage. The validation rules may be permissions specified by the plugin developer indicating webpages that may access the plugin 106. In some embodiments, the validation rules may specify webpage domain that may access the plugin 106 or may include regular expressions matching of the webpage URL. In some embodiments, the validation rules may determine whether a user is logged into the webpage. In some embodiments, the validation rules may be maintained and managed by a plugin manager 118. The plugin manager 118 may utilize an access control list to manage access to the plugin 106. An access control list may be a list of permissions associated with an object (e.g., plugin 106). The access control list may specify which users or webpages are granted access to the plugin 106.

In some embodiments, if the plugin does satisfy the validation rules, then at block 515, the plugin manager 118 may facilitate retrieval of the plugin 106 from the application 104. If the plugin 106 does not satisfy the validation rules, then at block 520, the plugin manager 118 may deny access to the plugin 106.

For example, the validation rules may determine that a permission level associated with the plugin 106 is set to public. If the permission level associated with the plugin 106 is set to public, then the plugin 106 may be available for any webpage to access. If the permission level is set to public, then the web browser 116 may retrieve the plugin 106 without any further determination.

If the permission level is not set to public (e.g., the permission level is set to private), then a determination may be made as to whether the website to be loaded by the web browser 116 is associated with the application 104. In some embodiments, a plugin 106 may only be available for use with a website that is associated with an application 104. For example, a user may download a content streaming application (e.g., Netflix application) to his or her user device 114. If the user attempts to access the content streaming website (e.g., www.netflix.com) using the user device 114, the Netflix application may have a plugin 106 that is available for use by the web browser 116 to enhance content streaming capabilities of the web browser 116. In some embodiments, if the permission level associated with the plugin 106 is set to private, the plugin 106 may only be available for use by the content streaming website (e.g., www.netflix.com) and may not be accessible by any other website. If the website is associated with the application 104, then the web browser 116 may retrieve the plugin 106. If the website is not associated with the application 104, then the web browser 116 may be denied access to the plugin 106.

In some embodiments, the plugin 106 may be associated with multiple applications. For example, if numerous applications are associated with each other (e.g., same application developer), a single plugin 106 may be available for all of the associated applications. This may require the user to download the application 104 that is bundled with the plugin 106. Once the initial application 104 is downloaded, subsequent associated applications may direct the web browser 116 to the initial application 104 with the plugin 106. In some embodiments, the plugin 106 may be stored in a shared directory space that is accessible by other applications. In some embodiments, the web browser 116 may be directed to the directory space for retrieval of the plugin 106.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A non-transitory computer-readable medium storing computer-executable instructions which, when executed by a processor, cause the processor to perform operations comprising:
   installing an application, wherein installing the application comprises receiving and storing (i) an executable application, (ii) a plugin, and (iii) an application manifest, wherein the application manifest specifies a path corresponding to the plugin;
   determining that the plugin is set to a private setting, wherein the private setting limits loading or utilization of the plugin to one or more pre-determined webpages, as opposed to a public setting that permits any webpage to load or utilize the plugin;
   requesting a webpage from the one or more pre-determined webpages, from a web server;
   parsing the webpage to determine that the webpage includes an instruction to use the plugin;
   determining the application comprises the plugin;
   obtaining the path corresponding to the plugin from the application manifest when the webpage is associated with the application; and
   presenting the webpage using the plugin.

2. The non-transitory computer-readable medium of claim 1, wherein the application manifest comprises one or more rules associated with the plugin and the operations further comprising determining, based at least in part on the one or more rules associated with the plugin, that the webpage has permission to access the plugin.

3. The non-transitory computer-readable medium of claim 1, wherein the application manifest further comprises metadata associated with the plugin.

4. The non-transitory computer-readable medium of claim 1, wherein the plugin comprises executable code to augment functionality for presenting the webpage.

5. A computer-implemented method comprising:
   requesting, by one or more computers, a webpage from a web server;
   parsing, by the one or more computers, the webpage to identify an instruction to invoke a plugin capable of being set to one or more settings, the one or more settings include at least one of a public setting or a private setting, wherein the public setting permits any webpage to load or utilize the plugin, and the private setting limits loading or utilization of the plugin to one or more pre-determined webpages;
   determining the plugin is set to the private setting;
   identifying, by the one or more computers, an application corresponding to the plugin;
   obtaining, by the one or more computers, a path corresponding to the plugin when the webpage is associated with the application;
   retrieving, by the one or more computers, the plugin based at least in part on the obtained path; and
   presenting, by the one or more computers, the webpage using the plugin.

6. The computer-implemented method of claim 5, wherein retrieving the plugin further comprises retrieving the plugin in response to requesting the webpage from the web server.

7. The computer-implemented method of claim 5, wherein obtaining the path corresponding to the plugin comprises obtaining, by the one or more computers, the path corresponding to the plugin from an application manifest associated with the application.

8. The computer-implemented method of claim 5, wherein the plugin is associated with a plurality of applications.

9. The computer-implemented method of claim 5, wherein the plugin provides a browser access to one or more application programming interfaces (APIs) associated with the application.

10. The computer-implemented method of claim 5, wherein the plugin provides digital rights management functionality associated with the application to a browser.

11. The computer-implemented method of claim 5, wherein identifying the application corresponding to the plugin further comprises using a registry of plugins.

12. The computer-implemented method of claim 5, wherein identifying the application corresponding to the plugin further comprises processing one or more application manifests to identify the application corresponding to the plugin.

13. A system comprising:
   at least one memory storing computer-executable instructions; and
   at least one processor, wherein the at least one processor is configured to access the at least one memory and to execute the computer-executable instructions to:
   request a webpage from a web server;
   parse the webpage to identify an instruction to invoke a plugin capable of being set to one or more settings, the one or more settings include at least one of a public setting or a private setting, wherein the public setting permits any webpage to load or utilize the plugin, and the private setting limits loading or utilization of the plugin to one or more pre-determined webpages;
   determine the plugin is set to the private setting;
   identify an installed application corresponding to the plugin;
   obtain a path corresponding to a location of the plugin when the webpage is associated with the application;
   retrieve the plugin based at least in part on the obtained path; and
   present the webpage based at least in part on the plugin.

14. The system of claim 13, wherein the at least one processor is further configured to execute the computer-executable instructions to:
   process one or more application manifests to identify the application corresponding to the plugin.

15. The system of claim 13, wherein the at least one processor is further configured to execute the computer-executable instructions to:
   use a registry of plugins to identify the installed application corresponding to the plugin.

16. The system of claim 13, wherein the at least one processor is further configured to execute the computer-executable instructions to:
   obtain the path corresponding to the location of the plugin from an application manifest.

17. The system of claim 16, wherein the application manifest further comprises one or more rules associated with the plugin for determining whether the webpage is authorized to access the plugin.

18. The system of claim 13, wherein the at least one processor is further configured to execute the computer-executable instructions to:
   retrieve the plugin in response to receipt of the request to access the webpage.

19. The system of claim 13, wherein the plugin provides a web browser access to one or more application programming interfaces (APIs) associated with the installed application.

20. The system of claim 13, wherein the plugin provides digital rights management functionality associated with the installed application to a web browser.

21. The system of claim 13, wherein the plugin provides a web browser with the capability to provide high-definition multimedia interface (HDMI) output.

\* \* \* \* \*